(12) United States Patent
Kobayashi et al.

(10) Patent No.: US 10,591,907 B2
(45) Date of Patent: Mar. 17, 2020

(54) WORK MANAGEMENT DEVICE

(71) Applicant: FUJI CORPORATION, Chiryu-shi (JP)

(72) Inventors: Hitoshi Kobayashi, Okazaki (JP); Junichi Kako, Nagoya (JP); Yoshimitsu Ishii, Ikazaki (JP); Kazuki Iwata, Kariya (JP)

(73) Assignee: FUJI CORPORATION, Chiryu-shi (JP)

( * ) Notice: Subject to any disclaimer, the term of this patent is extended or adjusted under 35 U.S.C. 154(b) by 190 days.

(21) Appl. No.: 15/528,583

(22) PCT Filed: Dec. 5, 2014

(86) PCT No.: PCT/JP2014/082306
§ 371 (c)(1),
(2) Date: May 22, 2017

(87) PCT Pub. No.: WO2016/088266
PCT Pub. Date: Jun. 9, 2016

(65) Prior Publication Data
US 2017/0261968 A1 Sep. 14, 2017

(51) Int. Cl.
*G05B 19/41* (2006.01)
*G05B 19/418* (2006.01)
(Continued)

(52) U.S. Cl.
CPC ....... *G05B 19/4189* (2013.01); *G05B 19/418* (2013.01); *H05K 13/00* (2013.01);
(Continued)

(58) Field of Classification Search
None
See application file for complete search history.

(56) References Cited

U.S. PATENT DOCUMENTS 8,548,838 B1 10/2013 Ganesan
2005/0209902 A1* 9/2005 Iwasaki .......... G06Q 10/063112
705/7.26
(Continued)

FOREIGN PATENT DOCUMENTS

JP 2000-222027 A 8/2000
JP 2000-277997 A 10/2000
(Continued)

OTHER PUBLICATIONS

International Search Report dated Mar. 3, 2015, in PCT/JP2014/082306 filed Dec. 5, 2014.
(Continued)

*Primary Examiner* — Jason Lin
(74) *Attorney, Agent, or Firm* — Oblon, McClelland, Maier & Neustadt, L.L.P.

(57) ABSTRACT

A work management device includes an operator information memory section, a work item memory section, an operator detection sections, and a work instruction section. The operator detection sections are installed at a plurality of spots of the electronic component mounting line and detect the operators near the spots. In a case in which the operator detection section detects the operator, when operator information regarding the operator is identical to operator information in the operator information memory section and the work item group of the work item memory section includes one work item or a plurality of work items which are able to be performed by the operator detected by the operator detection section, the work instruction section instructs the operator detected by the operator detection section in one work item or a plurality of work items selected from the one work item or the plurality of work items.

8 Claims, 18 Drawing Sheets

(51) Int. Cl.
　　　*H05K 13/00*　　(2006.01)
　　　*G06F 21/32*　　(2013.01)
　　　*G06K 9/00*　　(2006.01)

(52) U.S. Cl.
　　　CPC .............. *G05B 2219/39557* (2013.01); *G05B 2219/45032* (2013.01); *G06F 21/32* (2013.01); *G06K 9/00288* (2013.01); *Y02P 90/02* (2015.11); *Y02P 90/04* (2015.11)

(56) References Cited

U.S. PATENT DOCUMENTS

| | | | | |
|---|---|---|---|---|
| 2006/0178756 A1* | 8/2006 | Gotoh | ................ | G07C 9/00087 700/9 |
| 2006/0200264 A1* | 9/2006 | Kodama | .............. | G06Q 10/087 700/121 |
| 2007/0079355 A1* | 4/2007 | Chand | ................. | G05B 19/054 726/2 |
| 2009/0082881 A1* | 3/2009 | Awata | .............. | G05B 19/41805 700/10 |
| 2016/0078396 A1 | 3/2016 | Kamioka | | |

FOREIGN PATENT DOCUMENTS

| | | |
|---|---|---|
| JP | 2004-87999 A | 3/2004 |
| JP | 2007-335711 A | 12/2007 |
| JP | 2008-181293 A | 8/2008 |
| JP | 2008-197753 A | 8/2008 |
| JP | 2009-99949 A | 5/2009 |
| JP | 4491418 B2 | 6/2010 |
| WO | WO 2014/192462 A1 | 12/2014 |

OTHER PUBLICATIONS

Extended European Search Report dated Nov. 9, 2017 in Patent Application No. 14907484.1.

* cited by examiner

| Identification Information | Face Image |
|---|---|
| O1 |  |
| O2 |  |
| O3 |  |
| O4 |  |

| Identification Information | Face Image | Work Item | Mounting Machine |
|---|---|---|---|
| O1 |  | Item 1 | 10a |
| O1 |  | Item 2 | 10a |
| O3 |  | Item 3 | 10a |
| O2 |  | Item 1 | 10b |
| O2 |  | Item 3 | 10b |
| O1 |  | Item 1 | 10c |

FIG. 7

| Identification Information | Face Image | Work Item | Mounting Machine |
|---|---|---|---|
| O1 | 😊 | Item 2 | 10a |
| O3 | 😐 | Item 3 | 10a |
| O2 | 🙂 | Item 1 | 10b |
| O2 | 🙂 | Item 3 | 10b |
| O1 | 😊 | Item 1 | 10c |

| Identification Information | Face Image | Work Item | Mounting Machine | |
|---|---|---|---|---|
| O1 |  | Item 4 | 10a | ← Add |
| O1 |  | Item 2 | 10a | |
| O3 |  | Item 3 | 10a | |
| O2 |  | Item 1 | 10b | |
| O2 |  | Item 3 | 10b | |
| O1 |  | Item 1 | 10c | |

| Identification Information | Face Image | Degree of Difficulty |
|---|---|---|
| O1 |  | B |
| O2 |  | C |
| O3 |  | B |
| O4 |  | A |

FIG. 13

| Degree of Difficulty | Work Item | Mounting Machine |
|---|---|---|
| C | Item 11 | 10a |
| B | Item 12 | 10a |
| A | Item 13 | 10a |
| C | Item 11 | 10b |
| A | Item 13 | 10b |
| B | Item 11 | 10c |

WORK MANAGEMENT DEVICE

TECHNICAL FIELD

A technology disclosed in the present description relates to a work management device.

BACKGROUND ART

JP-A-2007-335711 discloses a control device that controls a mounting machine mounting electronic components on a board. The control device includes ID input means for inputting an ID of an operator, work input means for inputting work items to be performed on a mounting machine by the operator, and displaying means for displaying a work procedure of the work items. When the operator performs work on the mounting machine, the operator inputs an ID of the self-operator using the ID input means of the control device and inputs work items to be performed henceforth using the work input means. When the ID of the operator and the work items are input, the control device displays a work procedure of the work items on the displaying means in detail according to a level of the operator. In this configuration, in a case in which the level of the operator is low, work errors can be reduced when the control device displays a detailed work procedure. In a case in which the level of the operator is high, work efficiency can be improved when the control device displays a simple work procedure.

SUMMARY

Problem to be Solved

In the above-described control device, however, it is necessary for an operator to input work items to be performed henceforth. For this reason, it is necessary for the operator to manage a series of work items to be performed on the mounting machine. Further, it is necessary for the operator to select work items to be subsequently performed. A time taken to input the work items is wasted, and thus work efficiency deteriorates.

The present description provides a technology for reducing a burden on an operator performing work on a mounting machine and improving work efficiency more than in the related art.

Means for Solving the Problem

A work management device disclosed in the present description manages an electronic component mounting line with multiple mounting machines mounting electronic components on a board. The work management device includes an operator information memory section, a work item memory section, multiple operator detection sections, and one work instruction section or multiple work instruction sections. The operator information memory section stores operator information regarding multiple operators working in the electronic component mounting line. The work item memory section stores a work item group performed by the multiple operators in the electronic component mounting line. The operator detection sections are installed at multiple spots of the electronic component mounting line. The work instruction section instructs one operator among the multiple operators to work a work item selected from the work item memory section. The operator detection section detects the operator located near a spot at which the operator detection section is installed. In a case in which the operator detection section detects the operator, when operator information regarding the operator detected by the operator detection section is identical to operator information stored in the operator information memory section and the work item group stored in the work item memory section includes one work item or multiple work items which are able to be performed by the operator detected by the operator detection section, the work instruction section instructs the operator detected by the operator detection section in one work item or multiple work items selected from the one work item or the multiple work items. The operator detection section and the work instruction section may be installed physically in the mounting machine.

In a case in which there is one work item or the multiple work items which are able to be performed by the operator detected by the operator detection section, the work instruction section in the work management device instructs the operator in one work item or the multiple work items selected from the work items. Therefore, the operator may work in accordance with the instruction from the work instruction section and it is not necessary to select the work item to be subsequently performed by the operator. Accordingly, a burden on the operator is reduced. Since it is not necessary to input the work item, work efficiency is increased to that extent.

BRIEF DESCRIPTION OF DRAWINGS

FIG. 7 is a diagram illustrating information stored in the work item memory section updated by an updating section.

FIG. 13 is a diagram illustrating information stored in a work item memory section according to the second embodiment.

DESCRIPTION OF EMBODIMENTS

Figure 1:
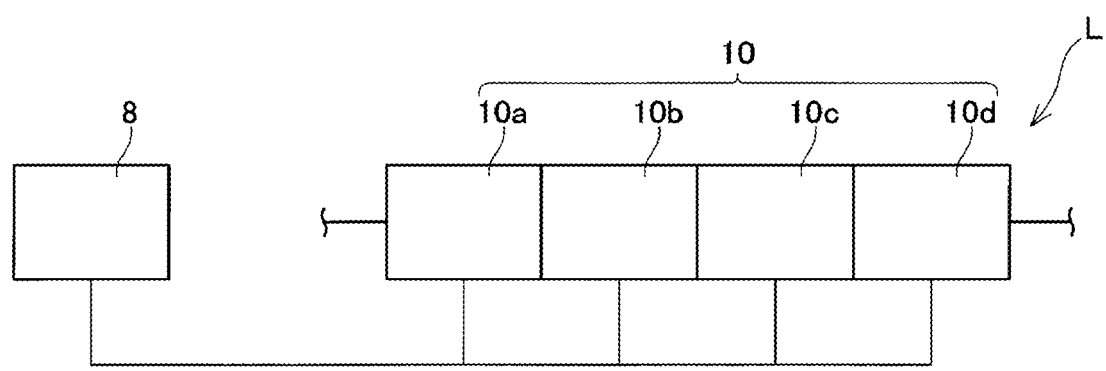
FIG. 1 is a diagram schematically illustrating a work management device and an electronic component mounting line managed by the work management device according to a first embodiment.

Main features according to embodiments to be described below will be listed. Technical elements to be described below are independent technical elements and exhibit technical usefulness alone or by various combinations and are not limited to combinations described in the claims at the time of application.

In a work management device disclosed in the present description, multiple mounting machines may be configured to detect end of work items in a work item group and transmit the end of the work items to the work management device. When the work management device receives the end of the work items from the mounting machine, the work management device may further include an updating section that deletes the ended work items from the work item group of the work item memory section and updates the work item group. In this configuration, the work item memory section stores only work items which are unperformed or being performed. Therefore, the fact that a work instruction section instructs an operator to work items which have already been ended disappears, and thus work can be efficiently progressed. Since the work items ended by the operator may not be deleted, a labor necessary to delete the work items is unnecessary, and thus it is possible to shorten a work time.

In the work management device disclosed in the present description, in a case in which an operator detection section detects an operator, when operator information regarding the operator detected by the operator detection section is identical to operator information stored in an operator information memory section and a work item group stored in the work item memory section does not include a work item which can be performed by the operator detected by the operator detection section, the work instruction section may instruct the operator detected by the operator detection section that there is no work item to be worked. In this configuration, in a case in which there is no work item which can be performed by the operator, the operator can clearly understand that there is not work item to be worked in an electronic component mounting line.

In the work management device disclosed in the present description, the multiple mounting machines may be configured to transmit mounting actual results on a board of electronic components to the work management device. The work management device may further include a work item addition section that adds work items necessary in the mounting machines to the work item memory section based on the mounting actual results transmitted from the multiple mounting machines. In this configuration, the work item addition section can add predict a work item necessary in each mounting machine in the near future based on the mounting actual result and add the work item to the work item memory section. Therefore, the operator can prepare work related to the work items in advance and progress the work smoothly without delay.

In the work management device disclosed in the present description, each of the multiple operator detection sections may be associated with one mounting machine or the multiple mounting machines near positions at which the operator detection sections are installed. In a case in which the operator detection section detects the operator, when the operator information regarding the operator detected by the operator detection section is identical to the operator information stored in the operator information memory section and the work item group stored in the work item memory section includes one work item or the multiple work items which are work items in the mounting machine associated with the operator detection section and are able to be performed by the operator detected by the operator detection section, the work instruction section may instruct the operator detected by the operator detection section in one work item or the multiple work items selected from the one work item or the multiple work items. In this configuration, the operator detection section is associated with one mounting machine or the multiple mounting machines near the operator detection section. In a case in which there are the work items which are able to be detected in the one mounting machine or the multiple mounting machines, the work instruction section instructs the operator detected by the operator detection section in the work item selected from the work items. Therefore, the operator performs the work in the mounting machine located near the operator. Accordingly, a movement distance up to the mounting machine of the operator can be shortened and a time in which the operator receives an instruction and starts the work can be shortened, and thus it is possible to improve work efficiency.

In a work management device disclosed in the present description, multiple mounting machines may be configured to detect end of work items in a work item group and transmit the end of the work items to the work management device. The work management device may further include: an updating section that deletes the ended work item from the work item group of the work item memory section and updates the work item group when the end of the work item is received from the mounting machine; and a display section that displays one work item or all the multiple work items for the operator detected by a specific operator detection section in a case in which the operator is detected by the specific operator detection section among the multiple operator detection sections when the operator information regarding the operator detected by the specific operator detection section is identical to the operator information stored in the operator information memory section and the work item group stored in the work item memory section includes one work item or the multiple work items which are able to be performed by the operator detected by the specific operator detection section. In this configuration, the operator can confirm all the work items which are able to be performed from now by the operator on the display section. Therefore, a work progress situation can be ascertained and end times of all the works can be predicted. The display section may be installed physically in the mounting machine.

In the work management device disclosed in the present description, the work item memory section or the operator information memory section may store each work item of the work item group in association with the operator information regarding the operator who is able to perform the work item. In a case in which the operator detection section detects the operator, when the operator information regarding the operator detected by the operator detection section is identical to the operator information stored in the operator information memory section and the work item group stored in the work item memory section includes one work item or the multiple work items associated with the operator information regarding the operator detected by the operator detection section, the work instruction section may instruct the operator detected by the operator detection section in one work item or the multiple work items selected from the one work item or the multiple work items. In this configuration, in the work item memory section or the operator information memory section, the work item and the operator information regarding the operator who is able to perform the work item are stored in association with each other. Therefore, the work management device can appropriately extract the work items which are able to be performed by the operator from the work item memory section.

In the work management device disclosed in the present description, the multiple mounting machines may be configured to detect end of work items in the work item group and transmit the end of the work items and the operator information regarding the operator performing the work item to the work management device. The work management device may further include an updating section that deletes the work item from the work item memory section and updates the work item group, in a case in which the end of the work item is received from the mounting machine, when the work item is worked based on the operator information by the operator who is able to perform the work item, and conversely does not delete the work item from the work item memory section when the work item is not worked by the operator who is able to perform the work item. In this configuration, the updating section does not delete the work item from the work item memory section before the work item is performed by the operator who is able to perform the work item. Therefore, all the work items can be performed by the operator who is able to perform each work item, and thus it is possible to reduce work errors.

In the work management device disclosed in the present description, the work items of the work item groups may be ranked in accordance with degrees of difficulty of the work items. The operator information may include the degrees of difficulty of the work items which are able to be performed by the multiple operators. The work item memory section may store the work items in association with the degrees of difficulty. In a case in which the operator detection section detects the operator, when the operator information regarding the operator detected by the operator detection section is identical to the operator information stored in the operator information memory section and the work item group stored in the work item memory section includes one work item or the multiple work items associated with the degrees of difficulty equal to or lower than the degrees of difficulty ranked for the operator detected by the operator detection section, the work instruction section may instruct the operator detected by the operator detection section in one work item or the multiple work items selected from the one work item or the multiple work items. In this configuration, since the work item is stored in association with the degree of difficulty in the work item memory section and the operator information includes the degree of difficulty of the work item which is able to be performed by the operator, the work management device can appropriately extract the work items which are able to be performed by each of the multiple operators from the work item memory section.

In the work management device disclosed in the present description, the multiple mounting machines may be configured to detect end of work items in the work item groups and transmit the end of the work item and the degrees of difficulty of the work items performed by the operator to the work management device. The work management device may further include an updating section that deletes the work item from the work item memory section and updates the work item group, in a case in which the end of the work item is received from the mounting machine, when the work items are worked by the operator ranked with the degree of difficulty or more in which the work items are able to be performed, and conversely does not delete the work item from the work item memory section when the work item is worked by the operator ranked with the degree of difficulty lower than the degree of difficulty in which the work item is able to be performed. In this configuration, the updating section does not delete the work item from the work item memory section before the work item is performed by the operator ranked with the degree of difficulty or more in which the work item is able to be performed. Therefore, it is possible to ensure that the work item is worked by the operator ranked with the degree of difficulty or more in which the work item is able to be performed.

The work management device disclosed in the present description may further include an environment map memory section that stores an environment map in which positional information regarding the multiple mounting machines disposed in predetermined regions and the multiple operator detection sections is recorded; and a support request input section that inputs necessity of a support request in the operator in a case in which each of the multiple mounting machines are installed and support is necessary in the operator working in the mounting machine. In a case in which the support request input section inputs the support request, the work instruction section may instruct the operator who is ranked with the degree of difficulty or more of the work item for which support is necessary and is closest to the mounting machine from which the support request is input to support the mounting machine to which the support request is input based on the environment map and a detection result of the operator detection section. In this configuration, the operator who is able to perform the work item for which the support is necessary can be quickly detected and the work efficiency can be improved. The support request input section may be installed physically in the mounting machine.

First Embodiment

A work management device 8 according to an embodiment will be described with reference to the drawings. FIG. 1 illustrates an electronic component mounting line L in which a circuit board 2 (see FIGS. 2 and 3) on electronic components 4 (see FIGS. 2 and 3) are mounted and a work management device 8 that manages the electronic component mounting line L. As illustrated in FIG. 1, the electronic component mounting line L includes four mounting machines 10 (10a, 10b, 10c, and 10d) that mount the electronic components 4 on the circuit board 2. The work management device 8 and each mounting machine 10 are connected to be able to communicate with each other. Multiple operators are disposed in the electronic component mounting line L and each operator perform various work items on each mounting machine 10. The electronic component mounting line L normally includes another board work machine such as a solder printing machine or a board inspection machine, which is not illustrated in FIG. 1.

Figure 2:
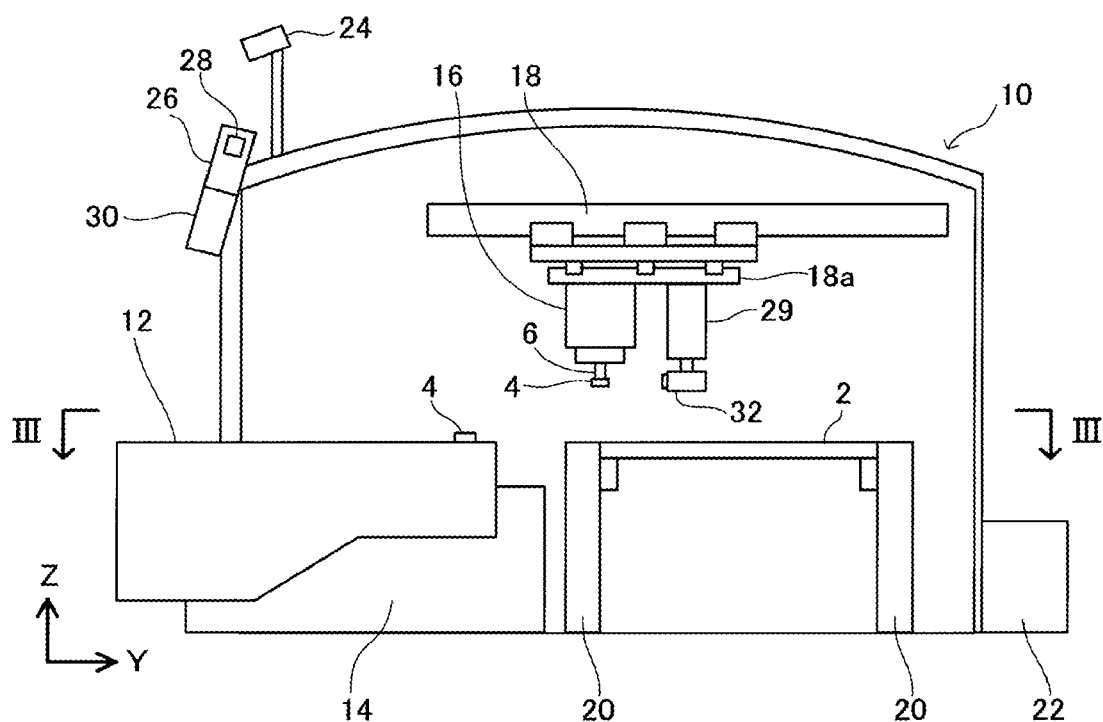
FIG. 2 is a side view schematically illustrating the configuration of a mounting machine according to the first embodiment.
Figure 3:
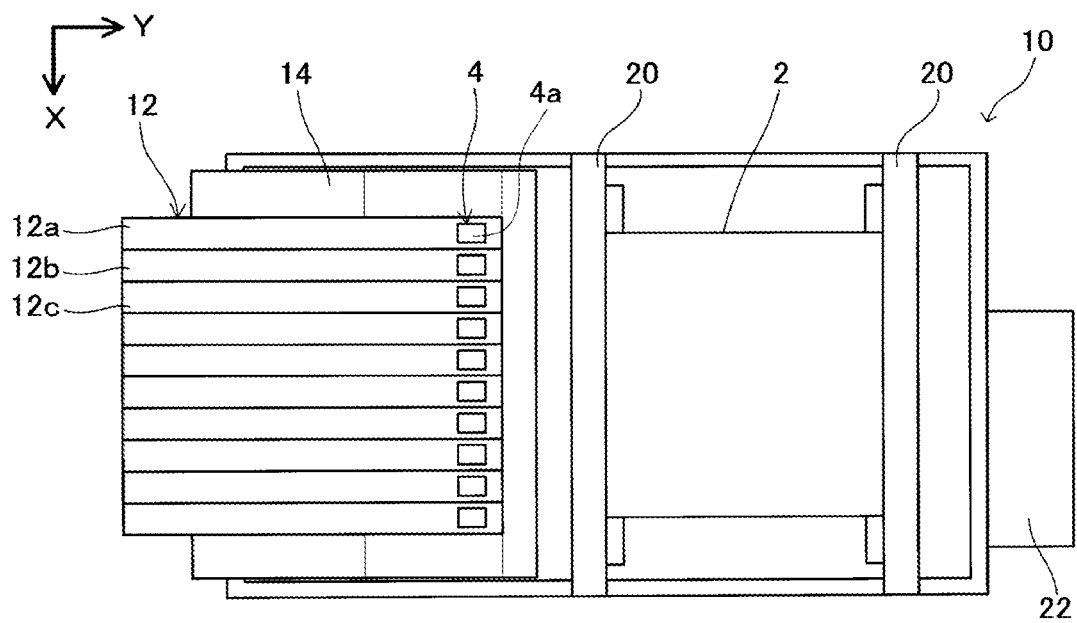
FIG. 3 is a longitudinal sectional view taken along the line of FIG. 2.

The mounting machine 10 will be described with reference to FIGS. 2 and 3. Each of the mounting machines 10a to 10d includes multiple component feeders 12, a feeder holding section 14, a mounting head 16, a head moving device 18, an imaging device 32, a board conveyor 20, and a control device 22. In the mounting machines 10 (10a to 10d), face authentication sensors 24 (24a to 24d), monitors 26 (26a to 26d), speakers 28 (28a to 28d), and monitors 30 (30a to 30d) are respectively installed. The face authentication sensor 24, the monitor 26, the speaker 28, and the monitor 30 are members included in the work management device 8, but are installed in the mounting machine 10 in the embodiment. The face authentication sensor 24 is equivalent to an example of a "operator detection section", the monitor 26 and the speaker 28 are equivalent to an example of a "work instruction section", and the monitor 30 is equivalent to an example of a "display section".

Each component feeder 12 accommodates multiple electronic components 4. The component feeder 12 is mounted to be detachably mounted on the feeder holding section 14 and supplies the electronic components 4 to the mounting head 16. A specific configuration of the component feeder 12 is not particularly limited. Each component feeder 12 may be, for example, any one of a tape type feeder that accommodates the multiple electronic components 4 on a wound tape, a tray type feeder that accommodates the multiple electronic components 4 on a tray, and a bulk type feeder that accommodates the multiple electronic components 4 in a container at random.

The mounting head 16 includes a nozzle 6 that sucks the electronic component 4. The mounting head 16 can move the nozzle 6 in the Z-direction (here, the vertical direction). The mounting head 16 can suck the electronic component 4 from the component feeder 12 through the nozzle 6 and mount the electronic component 4 sucked by the nozzle 6 on the circuit board 2. The head moving device 18 moves a fixing member 29 (to be described below) and the mounting head 16 between the component feeder 12 and the circuit board 2. For example, the head moving device 18 according to the embodiment is an XY robot moving a movement base 18a in X- and Y-directions and the mounting head 16 is mounted to be detachably mounted on the movement base 18a.

The imaging device 32 is fixed to the movement base 18a by the fixing member 29 and is moved integrally with the movement base 18a. The imaging device 32 images the electronic component 4 sucked by the nozzle 6. Image data of an image captured by the imaging device 32 is transmitted to the control device 22. The board conveyor 20 is a device that performs feeding, positioning, and discharge of the circuit board 2. For example, the board conveyor 20 according to the embodiment includes a pair of belt conveyor and a supporting device (not illustrated) that supports the circuit board 2 from the lower side.

The control device 22 is configured using a computer that includes a CPU and a memory. The control device 22 controls an operation of each section of the mounting machine 10, for example, based on a production program. The control device 22 detects a position and a posture of the electronic component 4 with respect to the nozzle 6 and calculates a correction amount of a mounting position by performing image processing on a captured image captured by the imaging device 32.

The control device 22 detects end of a work item performed on the mounting machine 10 by an operator. For example, when the operator exchanges the nozzle 6 in a case in which a work item is "exchanging the nozzle 6", the control device 22 detects that the exchanging of the nozzle 6 ends. When the control device 22 detects that the work item ends, the mounting machine 10 transmits the end of the work item to the work management device B.

The control device 22 calculates a mounting actual result of the electronic components 4 on the circuit board 2. For example, the control device 22 calculates a time until the electronic components 4 set in the component feeder 12 run out (hereinafter also referred to as a component shortage time) for each component feeder 12. The component shortage time is calculated from the number of electronic components 4 set in the component feeder 12 and a feeding speed of the component feeder 12. The mounting machine 10 transmits the component shortage time of each component feeder 12 to the work management device 3.

The face authentication sensor 24 is, for example, a CCD image sensor and is set so that a predetermined range of the circumference of the mounting machine 10 becomes a detection range. When the face authentication sensor 24 detects an operator located within the predetermined range, the face authentication sensor 24 images the face of the operator and transmits face image data to the work management device 8. The face authentication sensor 24 can image not only the face of an operator who is stopping but also, for example, the face of an operator who is walking.

In a case in which there are work items which can be performed in the mounting machine 10 in which the face authentication sensor 24 is installed by an operator who is detected by the face authentication sensor 24, the monitor 26 displays a work item selected from the work items for the operator. Conversely, in a case in which there is no work item which can be performed, the monitor 26 displays the fact that the there is no work item to be performed (which will be described below). The speaker 28 outputs content displayed on the monitor 26 by audio (which will be described below).

In a case in which there are work items which can be performed by an operator detected by the face authentication sensor 24 in one mounting machine 10 among the mounting machines 10a to 10d, the monitor 30 displays all of the work items (which will be described below).

Figure 4:
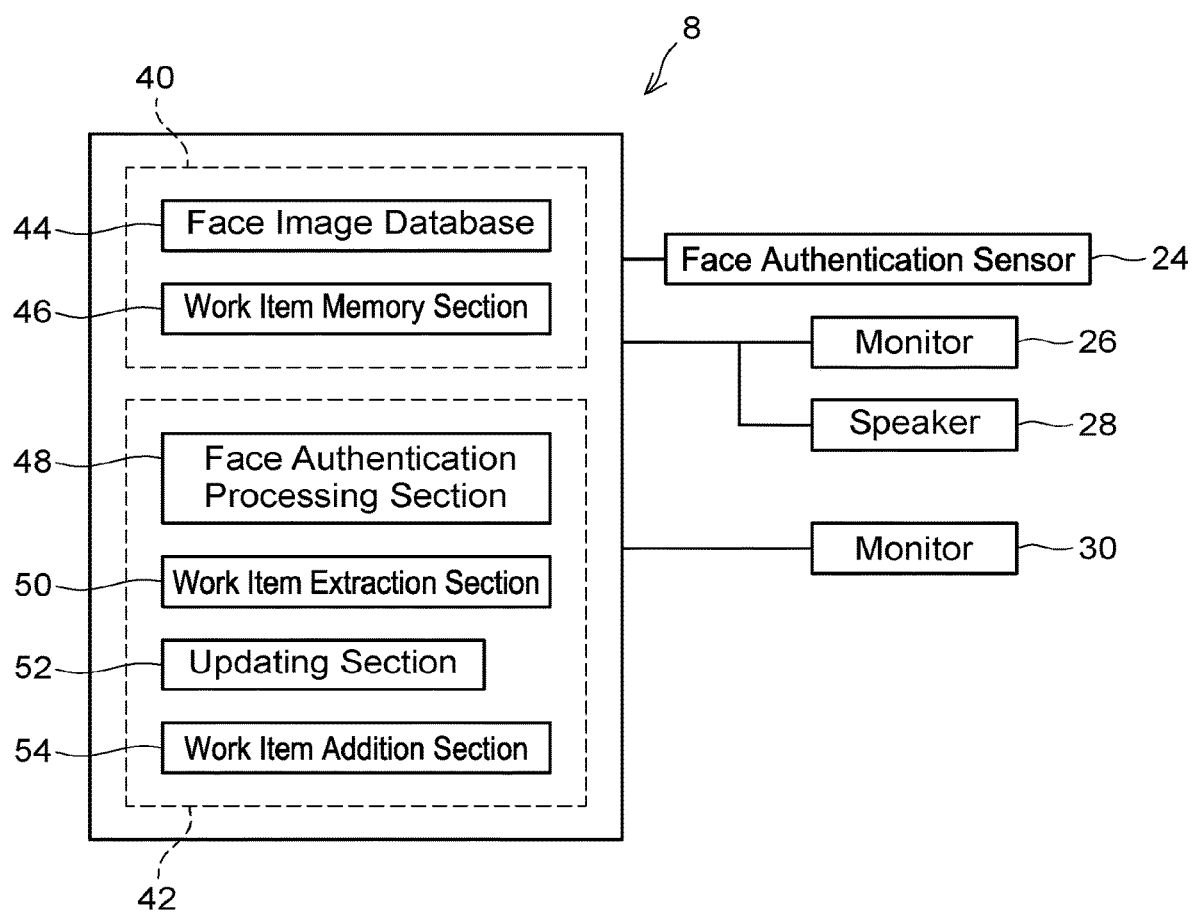
FIG. 4 is a block diagram illustrating the configuration of the work management device.

Next, the work management device 8 will be described with reference to FIG. 4. The work management device 8 is configured using a computer that includes a memory 40 and a CPU 42. The work management device 8 includes the face authentication sensor 24, the monitor 26, the speaker 28, and the monitor 30. In the embodiment, the members 24, 26, 28, and 30 are installed in the mounting machine 10 (see FIG. 2) and is connected to be able to communicate with the work management device 8.

Figure 5:
FIG. 5 is a diagram illustrating information stored in an operator information memory section according to the first embodiment.
Figure 5:
Figure 5:
Figure 5:

The memory 40 is provided with a face image database 44 and a work item memory section 46. As illustrated in FIG. 5, the face image database 44 stores face images of operators working in the electronic component mounting line L in association with pieces of identification information O1 to O4 regarding the operators (hereinafter operators with the pieces of identification information On (where n=1 to 4) are referred to as operators On). The pieces of identification information and the face images of the operators O1 to O4 working in the electronic component mounting line L are registered in advance In the face image database 44. The pieces of identification information and the face images of the operators are equivalent to examples of "operator information" and the face image database 44 is equivalent to an example of a "operator information memory section".

Figure 6:
FIG. 6 is a diagram illustrating information stored in a work item memory section according to the first embodiment.
Figure 6:
Figure 6:
Figure 6:
Figure 6:
Figure 6:

As illustrated in FIG. 6, the work item memory section 46 stores a work item group performed in the mounting machine 10. The face image and the identification information regarding the operator in charge of performing a work item and the kinds of mounting machines 10 (10a to 10d) performing the work item can be associated with the work item. For example, work items of item 1 are performed by an operator O1 in the mounting machine 10a and are performed by an operator O2 in the mounting machine 10b. As the work items, specifically, "detaching the component feeder 12b (see FIG. 3) from the feeder holding section 14", "setting the component feeder 12c (see FIG. 3) in the feeder holding section 14", and "exchanging the nozzle 6" can be exemplified. In the embodiment, to facilitate the description, such work items are represented as items 1, 2, . . . . In the work item memory section 46, one of the face image and the identification information regarding the operator may be configured to be associated with each work item.

A calculation program is stored in the memory 40. When the CPU 42 executes the calculation program, the CPU 42 functions as a face authentication processing section 48, a work item extraction section 50, an updating section 52, and a work item addition section 54. Face image data captured by the face authentication sensor 24 installed in the mounting machine 10 is transmitted from the mounting machine 10 to the work management device 8. The face authentication processing section 48 analysis the face image data, matches the analyzed face image data to a face image of the face image database 44, and identifies an operator in the face image database 44.

The work item extraction section 50 extracts work items in two stages. In the first stage, the work item extraction section 50 extracts work items associated with the face image and the identification information regarding the operator identified by the face authentication processing section 48 from the work item group of the work item memory section 46. The work management device 8 displays all of the work items extracted through the process of the first stage on the monitor 30 installed in the mounting machine 10. Conversely, in a case in which there is no work item associated with the face image and the identification information regarding the operator in the work item group of the work item memory section 46, the work item extraction section 50 does not extract the work item. In this case, the work management device 8 displays the fact that there is no work item to be performed on the monitor 30.

In the second stage, the work item extraction section 50 further extracts work items associated with the mounting machine 10 in which the face authentication camera 24 imaging the operator is installed from the work items extracted through the process of the first stage. The work management device 8 displays the work items selected from the work items extracted through the process of the second stage on the monitor 26 installed in the mounting machine 10 and announces the work items from the speaker 28. Conversely, in a case in which there is no work item associated with the mounting machine 10 in which the face authentication camera 24 imaging the operator is installed in the work items extracted through the process of the first stage, the work item extraction section 50 does not extract the work item. In this case, the work management device 8 displays the fact that there is not work item to be performed on the monitor 26 and announces the fact that there is not work item from the speaker 28. Since the work item memory section 46 stores each work item in association with the face image and the identification information regarding the operator, the work item extraction section 50 can accurately extract the work items which can be performed by the operator from the work item memory section 46.

When the control device 22 of the mounting machine 10 detects end of a work item, the mounting machine 10 transmits the end of the work item to the work management device 8. Then, in a case in which the face image and the identification information regarding the operator identified by the face authentication processing section 48 are identical to the face image and the identification information regarding the operator stored in association with the work item in the work item memory section 46, the updating section 52 deletes the work item from the work item group of the work item memory section 46 and updates the work item group. Otherwise, the updating section 52 does not update the work item group (that is, does not delete the work item from the work item group).

For example, a case will be considered in which the work management device 8 receives end of item 1 from the mounting machine 10a in a case in which the face authentication sensor 24a detects the operator O1. In this case, the face image and the identification information regarding the operator O1 identified by the face authentication processing section 48 are identical to the face image and the identification information regarding the operator O1 stored in association with item 1 and the mounting machine 10a in the work item memory section 46 (see FIG. 6). Therefore, as illustrated in FIG. 7, the updating section 52 deletes item 1 associated with the mounting machine 10a from the work item group. On the other hand, a case will be considered in which the work management device 8 receives the end of item 1 from the mounting machine 10a in a case in which the face authentication sensor 24a detects the operator O2. In this case, since the face image and the identification information regarding the operator O2 identified by the face authentication processing section 48 are not identical to the face image and the identification information regarding the operator O1 stored in association with item 1 and the mounting machine 10a in the work item memory section 46, the updating section 52 does not delete item 1 associated from the mounting machine 10a from the work item group.

As described above, the control device 22 calculates a component shortage time of the electronic components 4 set in each component feeder 12. The mounting machine 10 transmits a result of the calculation to the work management device S. The work item addition section 54 stores a required preparation time of each component feeder 12. The work item addition section 54 compares the component shortage time of each component feeder 12 transmitted from the mounting machine 10 to the required preparation time of the corresponding component feeder 12. When the component shortage time is equal to or less than the required preparation time, the work item addition section 54 adds a work item indicating that the component feeder 12 for which the components are shortage soon is exchanged with new component feeder 12 to the work item memory section 46. The work item addition section 54 adds the added work item to the work item memory section 46 by associating a work item to be added with the face image and the identification information regarding the operator and the kind of mounting machine 10 based on table data in which a work item for exchanging each component feeder 12 is associated with the face image and the identification information regarding the operator who can perform the work item.

The monitor 26 displays the work items selected from the work items extracted through the process of the second stage by the work item extraction section 50 for the operator. Therefore, only the work item associated with the mounting machine 10 in which the monitor 26 is installed is displayed on the monitor 26. The speaker 28 announces the same content as the work item displayed on the monitor 26 to the operator. The number of work items output by the monitor 26 and the speaker 28 is not 1, but two or more items may be output. In a case in which the work item extraction section 50 does not extract the work item through the process of the second stage, the monitor 26 displays the fact that there is not work item to be performed and the speaker 28 announces the same content (for example, "there is no work to be performed").

The monitor 30 displays all the work items extracted through the process of the first stage by the work item extraction section 50 for the operator. Therefore, the monitor 30 displays all the work items associated with the face image and the identification information regarding the operator detected by the face authentication sensor 24 (that is, identified by the face authentication processing section 48) in the work item group of the work item memory section 46 irrespective of whether the kinds of the mounting machines 10a to 10d.

Figure 9:
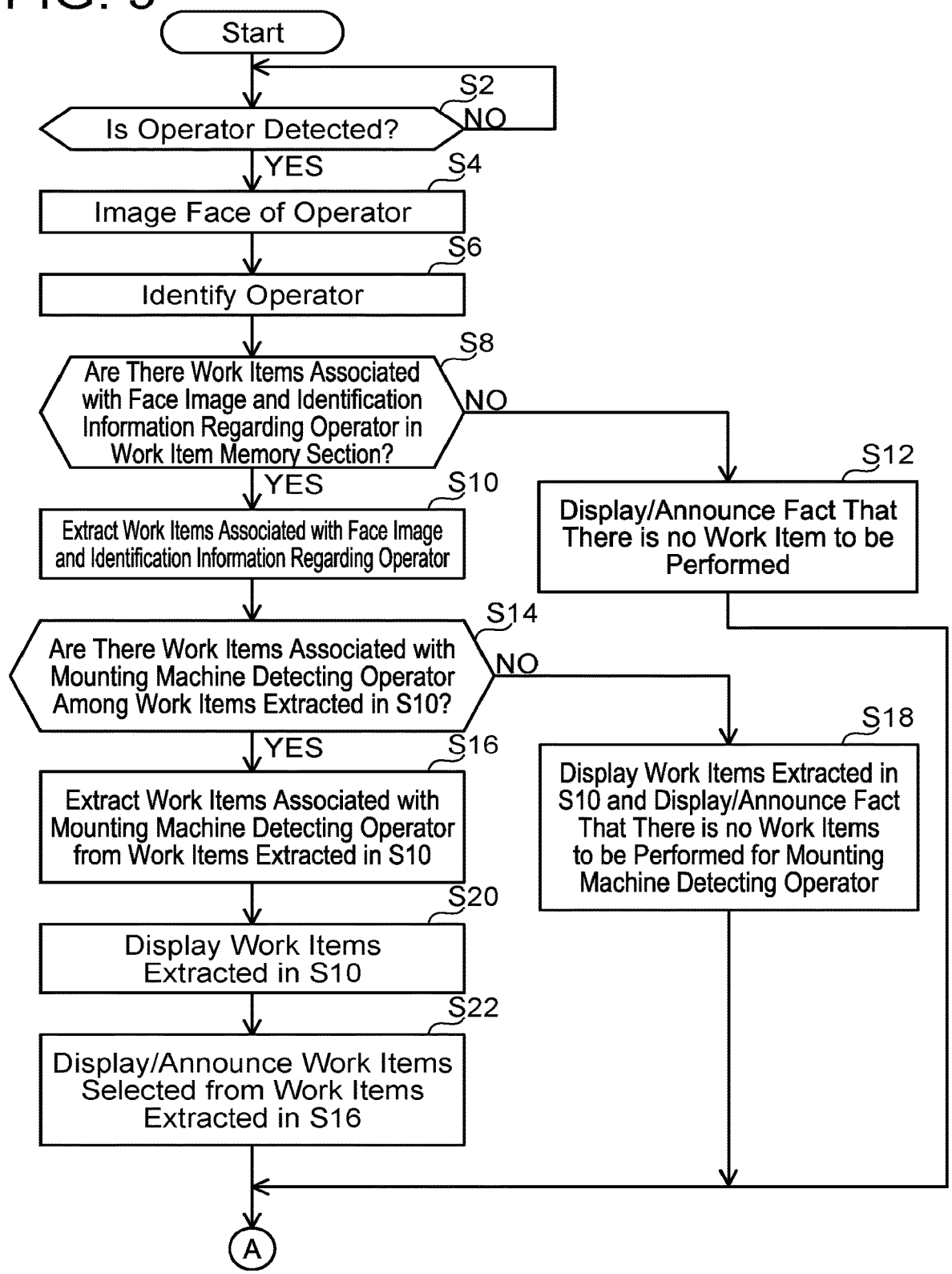
FIG. 9 is a flowchart (part 1) illustrating the flow of an operation of the work management device.
Figure 10:
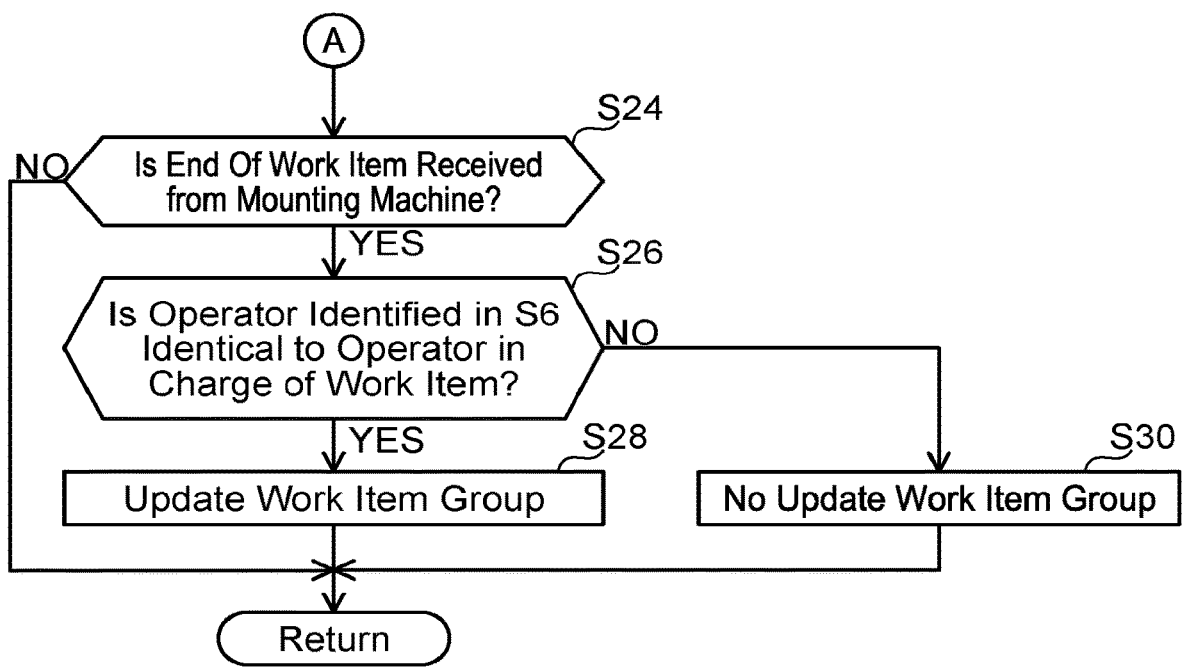
FIG. 10 is a flowchart (part 2) illustrating the flow of the operation of the work management device.

Next, an operation of the work management device 8 in the following Cases 1 to 3 will be described with reference to the flowcharts of FIGS. 9 and 10. Hereinafter, the work item memory section 46 stores the work item group illustrated in FIG. 6.

(Case 1: Operator O1 Approaches Mounting Machine 10a)

When the operator O1 approaches the mounting machine 10a and enters a detection range of the face authentication sensor 24a, the face authentication sensor 24a detects the operator O1 (YES in step S2) and images the face of the operator O1 (step S4). The face image data of the face of the operator O1 is transmitted from the face authentication sensor 24a to the work management device 8. Next, the face authentication processing section 48 of the work management device 8 identifies the operator O1 based on the face image database 44 (step S6). Subsequently, the work item extraction section 50 of the work management device 8 determines whether there are work items associated with the face image and the identification information regarding the operator O1 registered in the face image database 44 from the work item group stored in the work item memory section 46 (step S8). In Case 1, since there are the work items in the work item group (YES in step S8), the work items (that is, items 1 and 2 in the mounting machine 10a and item 1 in the mounting machine 10c) are extracted (step S10).

Subsequently, the work item extraction section 50 determines whether there are work items associated with the mounting machine 10a (that is, the mounting machine in which the face authentication sensor 24a detecting the operator O1 is installed) in the work items extracted in step S10 (step S14). In Case 1, since there are the work items in the work items extracted in step S10 (YES in step S14), the work items (that is, items 1 and 2) are extracted (step S16). Subsequently, the work management device 8 displays all the work items extracted in step S10 on the monitor 30a (step S20). For example, the work management device 8 displays "item 1 in the mounting machine 10a, item 2 in the mounting machine 10a, and item 1 in the mounting machine 10c" in the form of a table on the monitor 30a. Subsequently, the work management device 8 displays the work item (which is assumed to be item 1 in the embodiment) selected from the work items extracted in step S16 on the monitor 26a and announces item 1 from the speaker 28a (step S22). For example, the work management device 8 announces "Please perform item 1" from the speaker 28a.

The operator O1 can confirm all the work items which can be performed by the operator in the electronic component mounting line L on the monitor 30a. Therefore, the operator O1 understands that the operator O1 moves to the mounting machine 10c and performs work of item 1 when the operator O1 performs works of items 1 and 2 in the mounting machine 10a. Accordingly, it is not necessary for the operator O1 to manage which mounting machine 10 can perform which work item, and thus a burden on the operator O1 is reduced. Since the operator O1 can easily understand the kind of mounting machine 10 capable of performing the work item, the operator O1 can move to the mounting machine 10 which is to perform the work item without waste, and thus work efficiency is improved.

The operator O1 is instructed to perform the work items which can be performed in the mounting machine 10a using the monitor 26a and the speaker 28a. The face authentication sensor 24a detecting the operator O1 is installed in the mounting machine 10a. The monitor 26a and the speaker 28a are also installed in the mounting machine 10a. Therefore, when the operator O1 is instructed from the monitor 26a and the speaker 28a, the operator O1 can immediately start a work in the mounting machine 10a located near the operator O1, and thus the work efficiency can be improved.

When step S22 ends, the work management device 8 determines whether end of the work item is received from the mounting machine 10a after elapse of a predetermined time (step S24). When the work management device 8 receives the end of item 1 from the mounting machine 10a (YES in step S24), the updating section 52 of the work management device 8 determines whether the face image and the identification information regarding the operator O1 identified by the face authentication processing section 48 are identical to the face image and the identification information regarding the operator stored in association with item 1 in the work item memory section 46 (step S26). In Case 1, when the face images and the pieces of identification information are identical (YES in step S26), the updating section 52 deletes item 1 associated with the mounting machine 10a from the work item group of the work item memory section 46 and updates the work item group (see FIG. 7 (step S28)).

Thus, when the face authentication sensor 24a subsequently detects the operator O1, the work items (that is, item 2 in the mounting machine 10a and item 1 in the mounting machine 10c) in which item 1 associated with the mounting machine 10a is deleted are displayed on the monitor 30a and the operator is instructed in item 2 by the monitor 26a and the speaker 28a. In this way, when the work item ends, the updating section 52 deletes the ended work item from the work item group of the work item memory section 46. Thus, the work items to be performed from now and the work items which are currently being worked are stored in the work item memory section 46. Therefore, the operator O1 is not instructed in the already ended work item (for example, item 1) by the monitor 26a, the speaker 28a, and the monitor 30a, and the work can be progressed efficiently. Since it is not necessary for the operator to delete the work of the ended work item from a work item group list or the like, a work time can be shortened. When step S28 ends, the process returns to step S2.

(Case 2: Operator O4 Approaches Mounting Machine 10a)

In Case 2, the face authentication processing section 48 identifies the operator O4 through the same procedure as steps S2 to S6 of Case 1 (steps S2 to S6). Subsequently, the work item extraction section 50 determines whether there is the work item associated with the face image and the identification information regarding the operator O4 from the work item group stored in the work item memory section 46 (step S8). In Case 2, there is no work item in the work item group (NO in step S8). Therefore, the work management device 8 displays the fact that there is no work item to be performed on the monitor 30a and also displays/announces the fact that there is no work item using the monitor 26a and the speaker 28a (step S12). Thus, the operator O4 can understand that there is no work item which can be performed in the mounting machines 10a to 10d. Therefore, the operator O4 can perform another work (for example, a stage switching preparation work not stored in the work item memory section 46) other than the work items and can smoothly progress the work.

When step S12 ends, the work management device 8 determines whether the end of the work item is received from the mounting machine 10a after elapse of a predetermined time (step S24). In a case in which the operator O4 does not perform the work item in the mounting machine 10a, the work management device 8 does not receive the end of the work item from the mounting machine 10a even when the predetermined time elapses (NO in step S24) and the process returns to step S2. Conversely, in a case in which the operator O4 performs the work item (for example, item 1) in the mounting machine 10a, the work management device 8 receives the end of item 1 from the mounting machine 10a after the predetermined time elapses (YES in step S24). In this case, since the face image and the identification information regarding the operator O4 identified by the face authentication processing section 48 are not identical to the face image and the identification information regarding the operator O1 stored in association with item 1 in the work item memory section 46 (NO in step S26), the updating section 52 does not update the work item group of the work item memory section 46 (step S30) and the process returns to step S2. In this configuration, even when the operator other than the operator in charge of performing the work items performs the work items, the works are invalidated. Therefore, the operator in charge of performing the work items can be caused to reliably perform the work items.

(Case 3: Operator O2 Approaches Mounting Machine 10a)

In Case 3, the face authentication processing section 48 identifies the operator O2 through the same procedure as steps S2 to S6 of Case 1 (steps S2 to S6). Subsequently, the work item extraction section 50 determines whether there are the work items associated with the face image and the identification information regarding the operator O2 from the work item group stored in the work item memory section 46 (step S8). In Case 3, since there are the work items in the work item group (YES in step S8), the work items (that is, items 1 and 3 in the mounting machine 10b) are extracted (step S10). Subsequently, the work item extraction section 50 determines whether there are the work items associated with the mounting machine 10a among the work items extracted in step S10 (step S14). In Case 3, there is no work item in the work items extracted in step S10 (NO in step S14). Therefore, the work management device 8 displays "item 1 in the mounting machine 10b and item 3 in the mounting machine 10b" on the monitor 30a and displays/announces the fact that there is no work item to be performed in the mounting machine 10a using the monitor 26a and the speaker 28a (step S18). Thus, the operator O2 can understand that there is no work item which can be performed in the mounting machine 10a and there are the work items which can be performed in the mounting machine 10b. Therefore, the operator O2 can move to the mounting machine 10b and perform work.

In this configuration, it is possible to appropriately guide the operator up to the mounting machine 10 in which there are the work items which can be performed by the operator. Therefore, the operator does not hesitate to use the mounting machine 10 with which the operator works, and thus the work efficiency is improved. In this configuration, the operator O2 can clearly understand that there is no work item to be performed in the mounting machine 10a. This is particularly considerable in a case in which the monitor 30a displaying all the work items is not installed in the mounting machine 10a. That is, in a case in which the monitor 30a is not installed and the monitor 26a and the speaker 28a do not output the fact that there is no work item, the operator may doubt a detection error, a fault, or the like of the face authentication sensor 24a and may not be confident that there is really no work item which can be performed in the mounting machine 10a. However, in the foregoing configuration, since it is clarified; declared that there is no work item by the monitor 26a and the speaker 28a, the operator can move to another mounting machine 10 with confidence.

When step S18 ends, the work management device 8 operates in the same procedure as steps S24 to S30 of Case 2 (steps S24 to S30). Specifically, in a case in which the operator O2 performs the work item (for example, item 1) in the mounting machine 10a, the face image and the identification information regarding the operator O2 identified by the face authentication processing section 48 are not identical to the face image and the identification information regarding the operator O1 stored in association with item 1 in the work item memory section 46 (NO in step S26). Therefore, the updating section 52 does not update the work item group of the work item memory section 46 (step S30) and the process returns to step S2. Even in this configuration, the operator in charge of performing the work item can be caused to reliably perform the work item.

Figure 11:
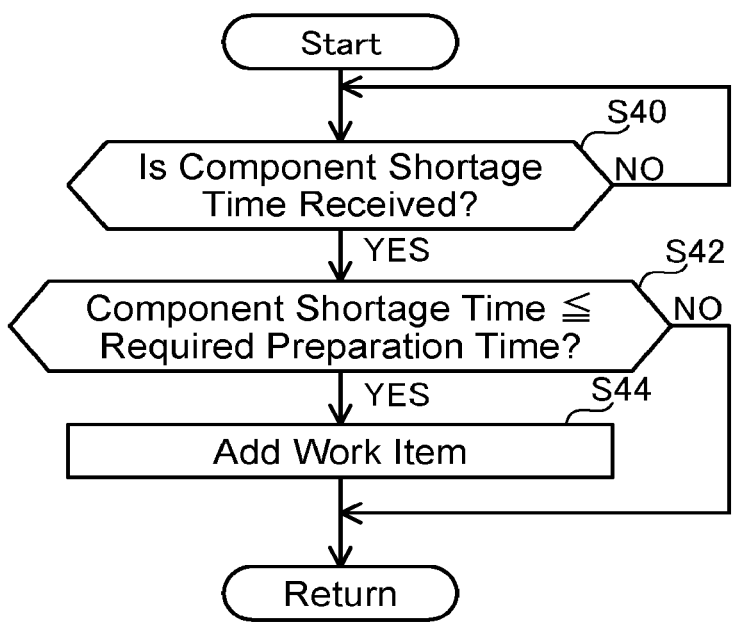
FIG. 11 is a flowchart illustrating the flow of an operation of the work item addition section of the work management device.

Next, an operation of the work item addition section 54 of the work management device 8 will be described with reference to the flowchart of FIG. 11. As described above, the work item addition section 54 adds a work item to the work item memory section 46 based on the table data. The table data stores a work item for exchanging the component feeder 12a (see FIG. 3) of the mounting machine 10a in association with the face image and the identification information regarding the operator O1. Hereinafter, the work item memory section 46 stores the work item group illustrated in FIG. 7.

Figure 8:
FIG. 8 is a diagram illustrating information stored in the work item memory section to which a work item is added by a work item addition section.
Figure 8:
Figure 8:
Figure 8:
Figure 8:
Figure 8:

The work management device 8 determines whether the component shortage time of each component feeder 12 is received from the mounting machine 10 (step S40). In a case in which the work management device 8 does not receive the component shortage time (NO in step S40), the process returns to step S40. Conversely, in a case in which the work management device 8 receives the component shortage time (YES in step S40), the work item addition section 54 of the work management device 8 determines whether the component shortage time of each component feeder 12 is equal to or less than the required preparation time of each component feeder 12 (step S42). In a case in which the component shortage time of each component feeder 12 is longer than the required preparation time of each component feeder 12 (NO in step S42), the process returns to step S40. Conversely, for example, in a case in which the component shortage time of the component feeder 12a is equal to or less than the required preparation time (for example, 3 minutes) of the component feeder 12a (YES in step S42), the work item addition section 54 adds a work item for exchanging the component feeder 12a (in FIG. 8, the work item is indicated as item 4) to the work item memory section 46 in association with the face image and the identification information regarding the operator O1 and the mounting machine 10a, as illustrated in FIG. 8 (step S44).

In this configuration, in a case in which the operator O1 is located near the mounting machine 10a (precisely, in a case in which the operator O1 is located in a detection range of the face authentication sensor 24a), the work item for exchanging the component feeder 12a is displayed on the monitor 26a and the same content is announced from the speaker 28a. Thus, the operator O1 can preferentially perform the work item. Conversely, in a case in which the operator O1 is located near the mounting machine (for example, the mounting machine 10b) other than the mounting machine 10a, the work item for exchanging the component feeder 12a is displayed on the monitor 30b. At this time, the work item may be displayed in a blinking manner so that the operator O1 can easily be aware that the work item is added. Thus, the operator O1 can move to the mounting machine 10a and perform exchange work for the component feeder 12a.

In this way, work can be progressed smoothly without delay by calculating the component shortage time and realizing a configuration in which exchanging the component feeder 12 is prepared in advance. At this time, the work item addition section 54 may write the component shortage time together in content of the work item (for example, "exchanging the component feeder 12a within 3 minutes"). The work item added by the work item addition section 54 is not limited to the exchange work for the component feeder 12, but all the work items necessary in the operation of the mounting machine 10 may be configured to be addable.

In the work management device 8 according to the first embodiment, when the face authentication sensor 24 detects the operator, the operator is instructed in the work item which can be performed in the mounting machine 10 by the monitor 26 and the speaker 28. Therefore, the operator may work in accordance with an instruction of the monitor 26 and the speaker 28 and it is not necessary for the operator to ascertain a flow of the work or manage a progress state of the work. Accordingly, it is possible to reduce the burden on the operator while maintaining the work precision.

Second Embodiment

Figure 12:
FIG. 12 is a diagram illustrating information stored in an operator information memory section according to a second embodiment.
Figure 12:
Figure 12:
Figure 12:

A work management device 108 according to a second embodiment will be described with reference to FIGS. 12 to 18. Hereinafter, differences from the first embodiment will be described. The same reference numerals are given to the same configurations as those of the first embodiment and the detailed description thereof will be omitted. In the second embodiment, the configurations of the work item memory section 146 and the face image database 144 are different from those of the first embodiment. Specifically, work items are ranked in accordance with the degrees of difficulty A, B, and C of the work items. As illustrated in FIG. 13, the work items are stored in the work item memory section 146 in association with the degrees of difficulty A to C of the work items and the kinds of mounting machines 10 in which the work items are performed. For example, item 13 performed in the mounting machine 10a is associated with the degree of difficulty A. The degree of difficulty increases from the degree of difficulty C to the degree of difficulty A. As illustrated in FIG. 12, the face image database 144 stores the degrees of difficulty A to C of the work items which can be performed by operators O1 to O4 are stored in association with the pieces of identification information (O1 to O4) and the face images of the operators. For example, the degree of difficulty B is ranked in the operator O1, which means that the operator O1 can perform the work items with the degree of difficulty B or less. That is, the operator O1 can perform not only the work item with the degree of difficulty B but also the work item with the degree of difficulty C.

Figure 14:
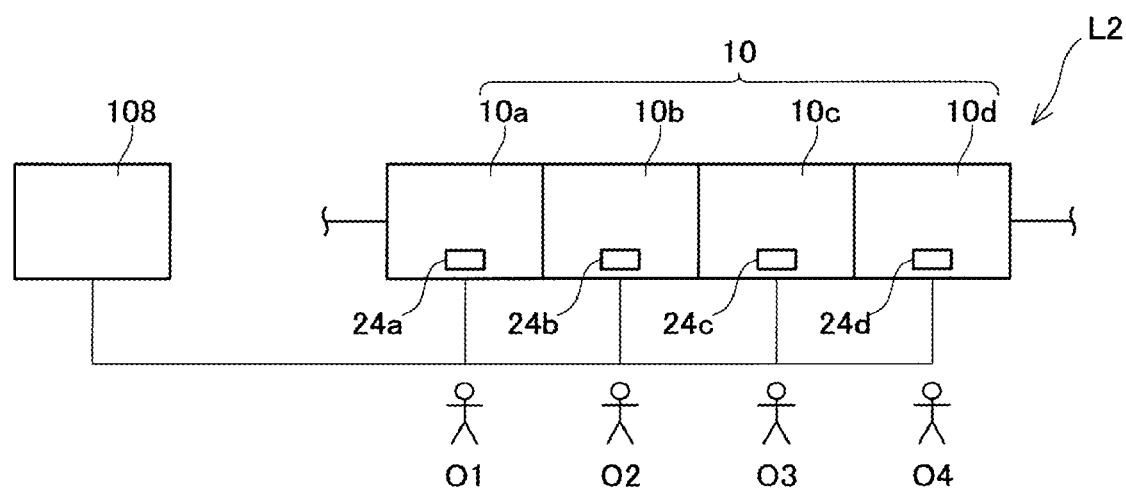
FIG. 14 is a diagram schematically illustrating a work management device and an operator located in an electronic component mounting line managed by the work management device according to the second embodiment.
Figure 15:
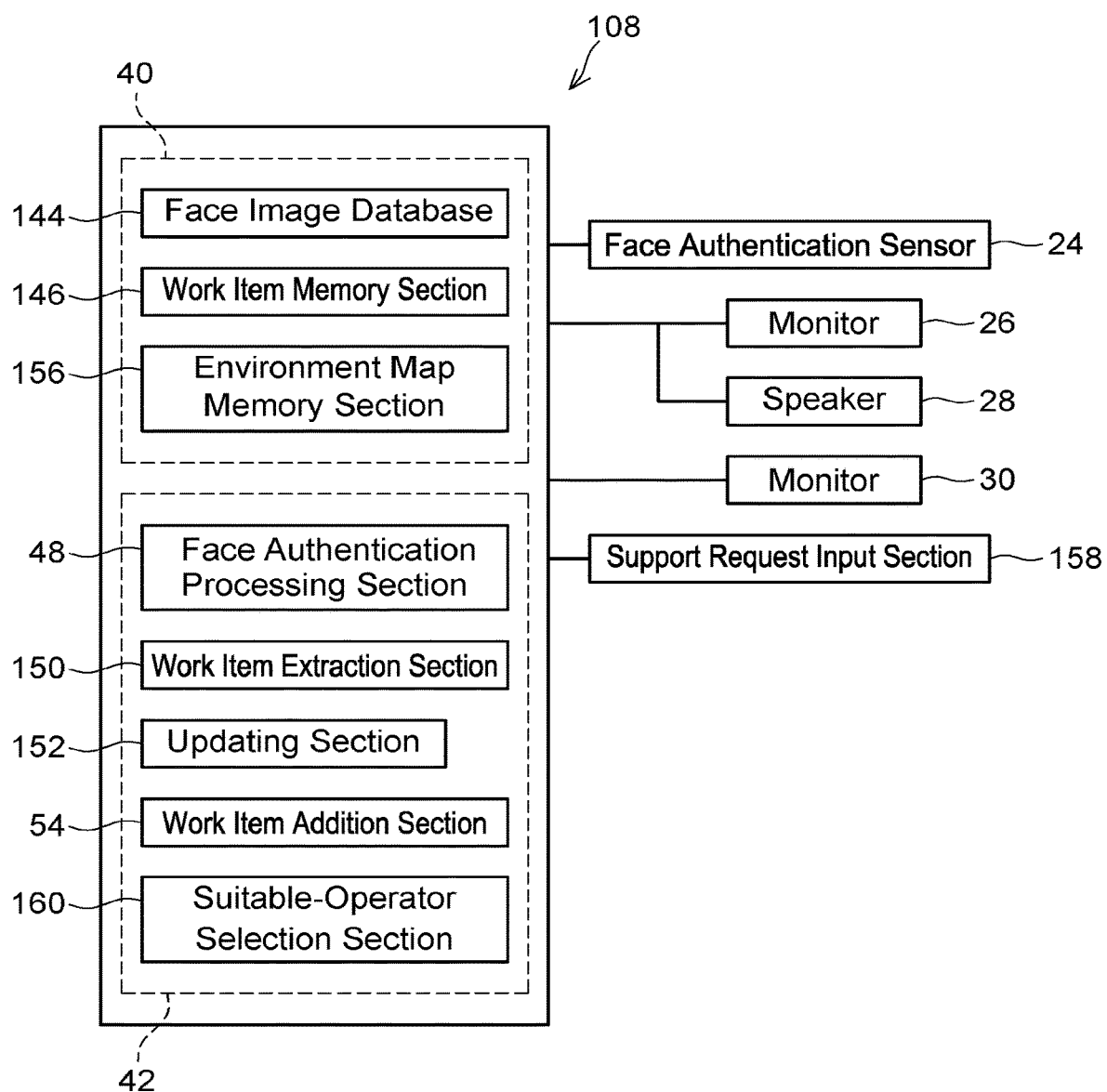
FIG. 15 is a block diagram illustrating the configuration of the work management device.
Figure 16:
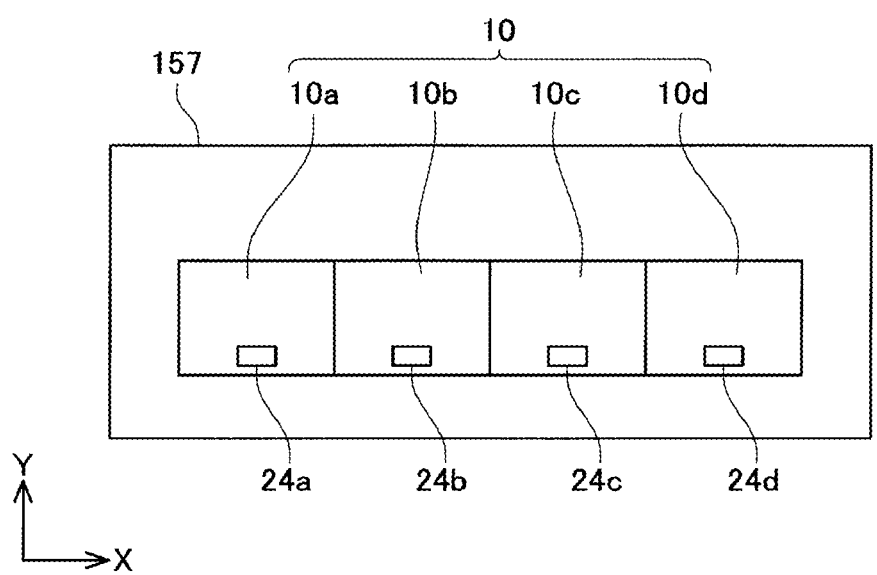
FIG. 16 is a diagram illustrating an environment map stored in an environment map memory section.

FIG. 14 illustrates the work management device 108 and an electronic component mounting line L2 according to the embodiment. As illustrated in FIG. 14, in the electronic component mounting line L2, operators O1 to O4 are located in a range in which the operators can be detected by face authentication sensors 24a to 24d. The operator O1 performs work of item 12 (see FIG. 13) in the mounting machine 10a. As illustrated in FIG. 15, the work management device 108 according to the first embodiment includes an environment map memory section 156, support request input sections 158 (158a to 158d), and a suitable-operator selection section 160 in addition to the configuration of the work management device 8 according to the first embodiment. The environment map memory section 156 is installed in the memory 40. As illustrated in FIG. 16, the environment map memory section 156 stores an environment map 157 in which positional information regarding the mounting machines 10a to 10d and the face authentication sensors 24a to 24d is recorded. The support request input sections 158a to 158d are installed in the mounting machines 10a to 10d, respectively. The support request input section 158 can input the fact that the operator requires a support request in a case in which support is necessary for the operator working in the mounting machine 10. When the support request is input to the support request input section 158, the work management device 108 receives that the support request is input. The suitable-operator selection section 160 selects a person most suitable for the support request among the operators located within the range in which the face authentication sensor 24 can detect the operators in the electronic component mounting line L2.

Figure 17:
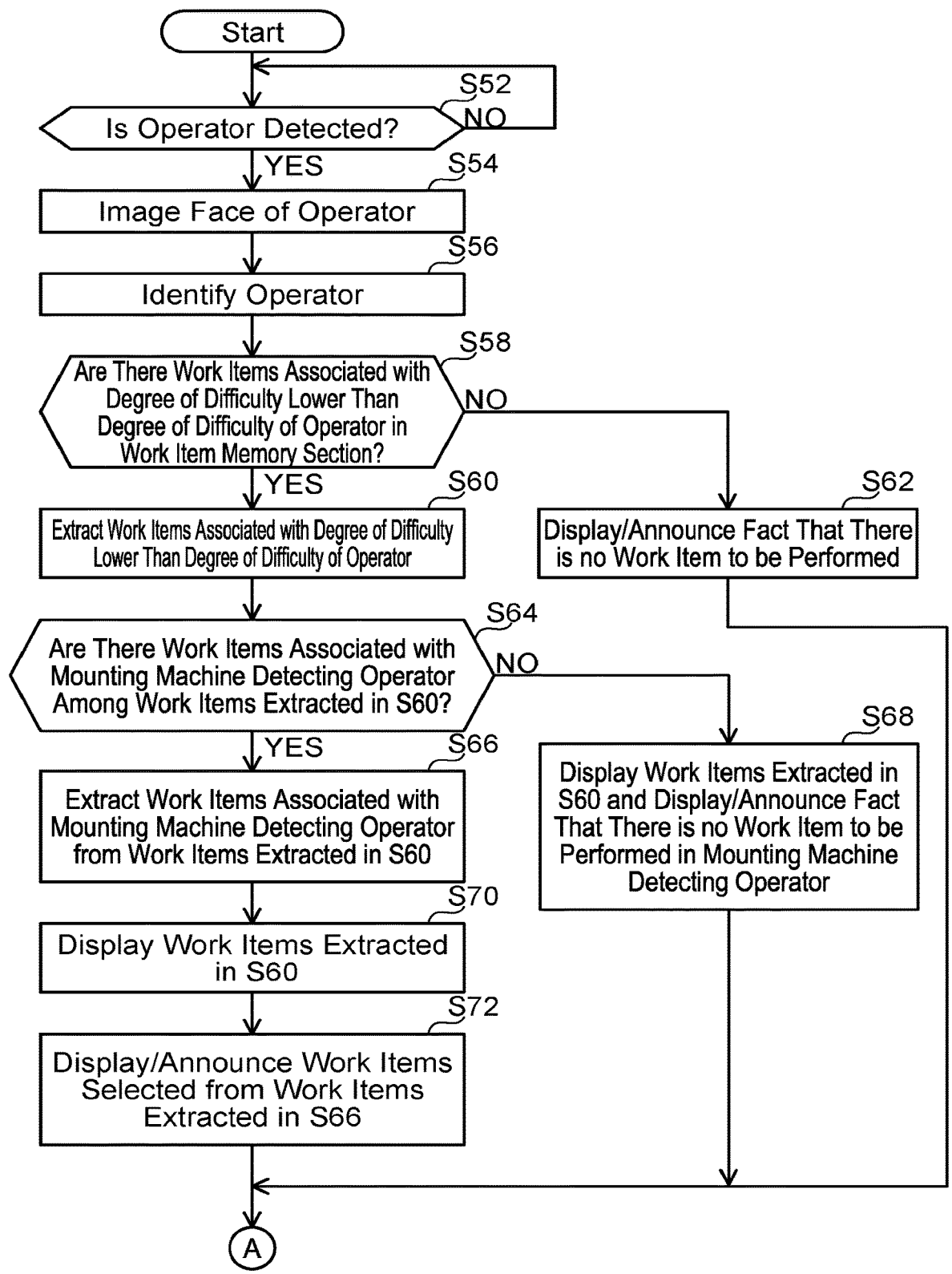
FIG. 17 is a flowchart (part 1) illustrating the flow of an operation of the work management device.
Figure 18:
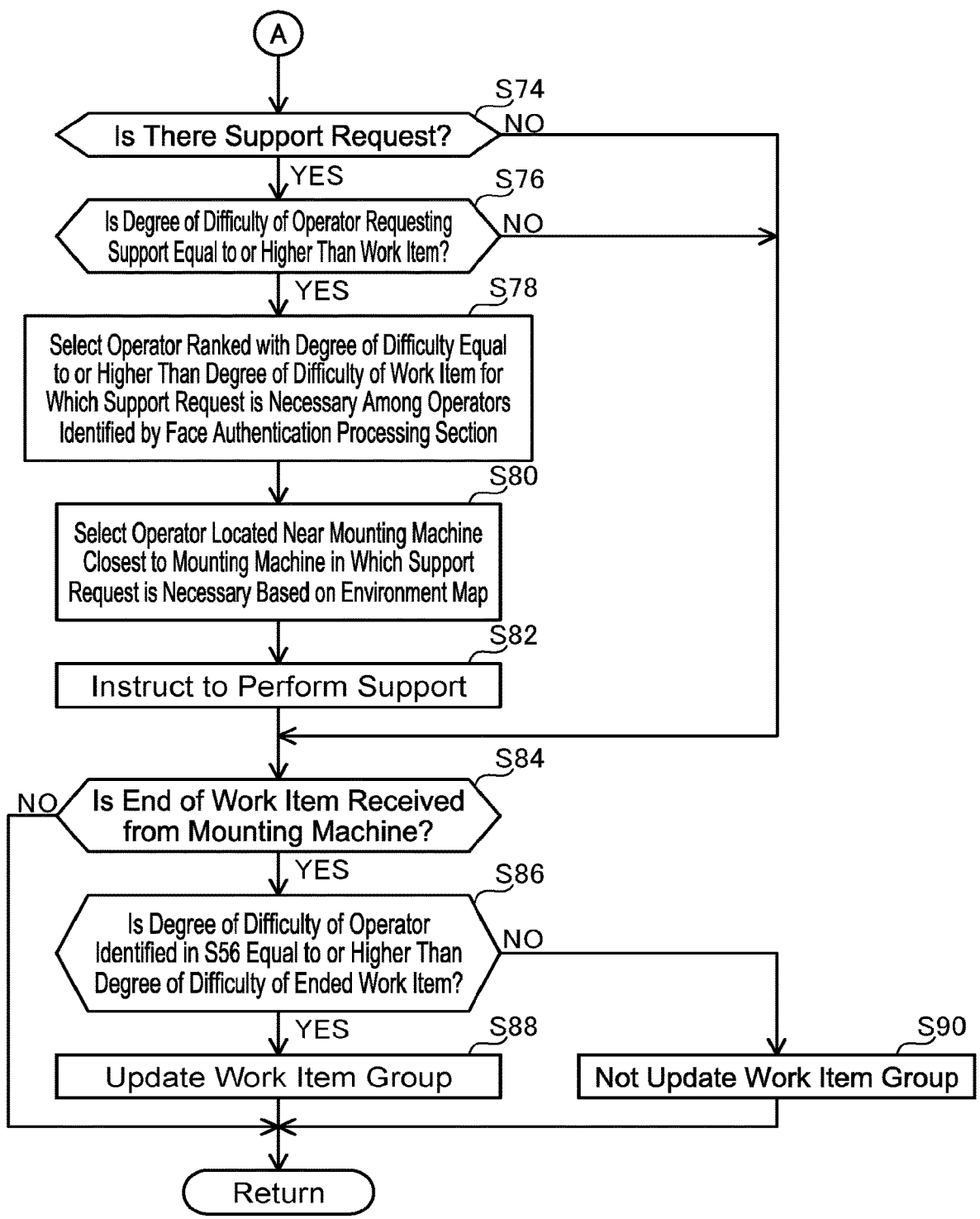
FIG. 18 is a flowchart (part 2) illustrating the flow of the operation of the work management device.

Next, an operation of the work management device 108 in the following Cases 4 to 6 will be described with reference to the flowcharts of FIGS. 17 and 18. Hereinafter, the work item memory section 146 stores the work item group illustrated in FIG. 13.

(Case 4: Operator O1 Approaches Mounting Machine 10a)

When the face authentication sensor 24a first detects the operator O1 (YES in step S52) and images the face of the operator O1 (step S54), the face authentication processing section 48 identifies the operator O1 based on the face image database 144 (step S56). Next, the work item extraction section 150 determines whether there is a work item associated with the degree of difficulty lower than the degree of difficulty (that is, the degree of difficulty B) ranked by the operator O1 in the work item group stored in the work item memory section 46 (step S58). In Case 4, since there is the work item (YES in step S58), the work item extraction section 150 extracts items 11 and 12 in the mounting machine 10a, item 11 in the mounting machine 10b, and item 11 in the mounting machine 10c as the work items (step S60). Subsequently, the work item extraction section 150 determines whether there are work items associated with the mounting machine 10a among the work items extracted in step S60 (step S64). In Case 4, since there are the work items associated with the mounting machine 10a among the work items extracted in step S60 (YES in step S64), the work items (that is, items 11 and 12) are extracted (step S66).

Subsequently, the work management device 108 displays all the work items extracted in step S60 on the monitor 30a (step S70) and displays/announces a work item (for example, item 12) selected from the work items extracted in step S66 using the monitor 26a and the speaker 28a (step S72). When step S72 ends, the work management device 108 determines whether a support request is input to the support request input section 158 (step S74). In a case in which the work management device 108 does not receive the input of the support request (NO in step S74_), the process proceeds to step S84. Conversely, when the support request is input to the support request input section 158a, the work management device 108 receives the input of the support request (YES in step S74). Subsequently, the work management device 108 determines whether the degree of difficulty ranked for the operator inputting the support request is equal to or higher than the degree of difficulty of the work item for which support is necessary (step S76). In Case 4, since the degree of difficulty B of the operator O1 is identical to the degree of difficulty B of item 12 (YES in step S76), the process proceeds to step S78. Conversely, when the degree of difficulty of the operator is lower than the degree of difficulty of the work item for which the support is necessary (NO in step S76), the process proceeds to step S84.

Since face image data of the operator detected by the face authentication sensor 24 of each mounting machine 10 is intermittently transmitted to the face authentication processing section 48, the face authentication processing section 48 identifies operators O1 to O4 located near the mounting machines 10 in advance. The suitable-operator selection section 160 of the work management device 108 selects operators O3 and O4 ranked with the degree of difficulty equal to or higher than the degree of difficulty B of item 12 for which the support is necessary among the remaining operators O2 to O4 excluding the operator O1 requesting the support based on the face image database 144 (step S78 (see FIG. 12)). Subsequently, the suitable-operator selection section 160 selects the operator O3 detected by the face authentication sensor 24c closer to the mounting machine 10a in which the operator O1 works between the face authentication sensors 24c and 24d detecting operators O3 and O4 as an operator most suitable for the support request based on the environment map 157 (step S80). Subsequently, the work management device 108 displays/announces the support of the mounting machine 10a to the operator O3 using the monitor 26c and the speaker 28c of the mounting machine 10c (step S82). In this configuration, in a case in which the operator requests support, the operator most suitable for the support can be quickly detected and the operator can be instructed to perform the support. Therefore, it is possible to suppress delay of the work, and thus the work efficiency is improved.

When step S82 ends, the work management device 108 determines whether end of the work item is received from the mounting machine 10a after elapse of a predetermined time (step S84). When the work management device 108 receives the end of item 12 (YES in step S84), the updating section 152 determines whether the degree of difficulty ranked for the operator O1 identified by the face authentication processing section 48 is equal to or higher than the degree of difficulty stored in association with item 12 in the work item memory section 46 (step S86). In Case 4, since both the degrees of difficulty are identical (YES in step S86), the updating section 152 updates the work item group (step S88). In a case in which step S88 ends and a case in which the end of the work item is not received even after the elapse of the predetermined time (NO in step S84), the process returns to step S52.

In the foregoing configuration, since the work item memory section 146 does not store the face image or the identification information regarding the operator, the operator ranked with the same degree of difficulty can perform the same work item. Therefore, even when a certain operator does not continue the work, the operator ranked with the degree of difficulty which is the same as or equal to or higher than the degree of difficulty of the operator performs the work instead of the certain operator, and thus information of the work item memory section 146 may not be rewritten. Accordingly, it is possible to efficiently progress the work while suppressing deterioration in work precision. In the foregoing configuration, an operator can perform the work item associated with the degree of difficulty equal to or lower than the degree of difficulty ranked for the operator. Therefore, the degree of freedom of the work item which can be performed by each operator can increase, and thus flexible measures even when an operator is vacant.

(Case 5: Operator O2 Approaches Mounting Machine 10a after Performing Item 11 in the Mounting Machine 10a and Item 11 in the Mounting Machine 10b)

In Case 5, the face authentication processing section 48 identifies the operator O2 through the same procedure as steps S52 to S56 of Case 4 (steps S52 to S56). Next, the work item extraction section 150 determines whether there are work items associated with degree of difficulty equal to or lower than the degree of difficulty (that is, the degree of difficulty C) ranked for the operator O2 in the work item group stored in the work item memory section 146 (step S58). In Case 5, item 11 in the mounting machine 10a and item 11 in the mounting machine 10b end, and the updating section 152 performs updating by deleting the two work items from the work item memory section 146 illustrated in FIG. 13. Therefore, there is no work item satisfying the foregoing condition in the work item group (NO in step S58). Therefore, the work management device 108 displays the fact that there is no work item to be performed on the monitor 30a and also displays/announces the fact that there is no work item using the monitor 26a and the speaker 28a (step S62).

When step S62 ends, the work management device 108 determines whether a support request is input to the support request input section 158 (step S74). In a case in which the work management device 108 does not receive the input of the support request (NO in step S74), the process proceeds to step S84. Conversely, when the operator O2 performs item 12 (the degree of difficulty B) in the mounting machine 10a and the support request is assumed to be input to the support request input section 158a while item 12 is being performed (YES in step S74), the work management device 108 determines whether the degree of difficulty C ranked for the operator O2 inputting the support request is equal to or higher than the degree of difficulty of item 12 which is a work item for which support is necessary (step S76). In Case 5, since the degree of difficulty C of the operator O2 is lower than the degree of difficulty B of item 12 (NO in step S76), the work management device 108 determines that the support request is an inappropriate support request and does not perform the instruction of the support. Then, the process proceeds to step S84.

The work management device 108 determines whether end of the work item is received from the mounting machine 10a after the elapse of the predetermined time (step S84). In a case in which the operator O2 does not perform the work item in the mounting machine 10a, the work management device 108 does not receive the end of the work item from the mounting machine 10a even after the elapse of the predetermined time (NO in step S84), and then the process returns to step S52. Conversely, in a case in which the operator O2 performs the work item (for example, item 12) in the mounting machine 10a, the work management device 108 receives the end of item 12 from the mounting machine 10a after the elapse of the predetermined time (YES in step S84). In this case, it is determined whether the degree of difficulty ranked for the operator O2 identified by the face authentication processing section 48 is equal to or higher than the degree of difficulty stored in association with item 12 in the work item memory section 46 (step S86). In Case 5, since the degree of difficulty C ranked for the operator O2 is lower than the degree of difficulty B associated with item 12 (NO in step S86), the updating section 152 does not update the work item group (step S90), and then the process returns to step S52. Even in this configuration, the operator in charge of performing the work item can be caused to reliably perform the work item.

(Case 6: Operator O2 Approaches Mounting Machine 10c)

In Case 6, the face authentication processing section 48 identifies the operator O2 through the same procedure as steps S52 to S58 of Case 4 (steps S52 to S58). In Case 6, there are work items associated with the degree of difficulty equal to or lower than the degree of difficulty (that is, the degree of difficulty C) ranked for the operator O2 in the work item group stored in the work item memory section 46 (YES in step S58). Therefore, the work item extraction section 150 extracts the work items (that is, item 11 in the mounting machine 10a and item 11 in the mounting machine 10b) (step S60). Subsequently, the work item extraction section 150 determines whether there are work items associated with the mounting machine 10a among the work items extracted in step S60 (step S64). In Case 6, since there is no work item (NO in step S64), the work management device 108 displays "item 11 in the mounting machine 10a and item 11 in the mounting machine 10b" on the monitor 30a and displays/announces the fact that there is no work item to be performed in the mounting machine 10a using the monitor 26a and the speaker 28a (step S68). Thus, the operator O2 can understand that there is no work item which can be performed in the mounting machine 10c and there are the work items which can be performed in the mounting machines 10a and 10b. Therefore, the operator O2 can move to the mounting machine 10a or 10b and perform work.

When step S68 ends, the work management device 108 determines whether a support request is input to the support request input section 158 (step S74). In a case in which the work management device 108 does not receive the input of the support request (NO in step S74), the process proceeds to step S84. Conversely, when the operator O2 performs item 11 (the degree of difficulty B) in the mounting machine 10c and the support request is assumed to be input to the support request input section 158c while item 11 is being performed (YES in step S74), the work management device 108 determines whether the degree of difficulty C ranked for the operator O2 inputting the support request is equal to or higher than the degree of difficulty of item 11 which is a work item for which support is necessary (step S76). In Case 6, since the degree of difficulty C of the operator O2 is lower than the degree of difficulty B of item 11 (NO in step S76), the work management device 108 determines that the support request is an inappropriate support request and does not perform the instruction of the support. Then, the process proceeds to step S84.

The work management device 108 operates through the same procedure as steps S84 to S90 of Case 5 (steps S84 to S90). Specifically, in a case in which the operator O2 performs item 11 in the mounting machine 10c, the degree of difficulty C ranked for the operator O2 identified by the face authentication processing section 48 is lower than the degree of difficulty B stored in association with item 11 of the mounting machine 10c in the work item memory section 46 (NO in step S86). Therefore, the updating section 152 does not update the work item group (step S90) and the process returns to step S52. Even in this configuration, the operator in charge of performing the work item can be caused to reliably perform the work item.

The embodiments of the technology disclosed in the present description have been described in detail, but are merely example. A semiconductor device disclosed in the present description is included in various modifications and changes of the foregoing embodiments.

For example, one face authentication sensor 24 is installed in each mounting machine 10. However, the technology is not limited to this configuration and one face authentication sensor 24 may be disposed in two mounting machines 10 adjacent to each other. In this case, a detection range of the face authentication sensor 24 preferably reaches the vicinity of the two adjacent mounting machines 10. Instead of the face authentication sensor 24, an RF tag may be used or a biometric authentication such as fingerprint authentication or iris authentication may be used. The monitor 26, the speaker 28, and the monitor 30 may not be installed in the mounting machine 10, but may be disposed near the mounting machine 10, for example. Only one monitor 30 may be configured in the electronic component mounting line. The work management device 8 may be configured to include only one of the monitors 26 and the speaker 28. When an ended work item is configured not to be instructed to an operator, the work management device 8 may not include the updating section 52. The work management device 8 may not include the monitor 30 or may not include the work item addition section 54.

Multiple operators may perform work in one mounting machine 10. In this case, only when the operator enters the detection range of the face authentication sensor 24, the operator is instructed in a work item which can be performed. Therefore, a process of switching the operators can be easily performed. It is not necessary for the operator to switch a display screen of the monitor, and thus it is possible to shorten a work time.

When the operator is instructed in a work item, an earphone, an instruction to use a smartphone, a transceiver, or the like instead of the monitor 26 or the speaker 28 may be given. Priority may be set in the work items and the monitor 26 or the speaker 28 may instruct the operator to perform the work item in the order of the priority.

All the work items which can be performed by the operator may be printed on a sheet medium by a printer instead of displaying the work items on the monitor 30. An operator detection section such as the face authentication camera 24 may be included in the printer and the printer may be installed at an entrance of a manufacturing site. In this configuration, when an operator passes through the entrance of the site, the printer prints a sheet on which all the work items which can be performed by the operator is written. Thus, the operator can ascertain a work progress situation.

According to the second embodiment, each work item of the work item memory section 146 is stored in association with degrees of difficulty A to C of the work items and the kind of the mounting machines 10 performing the work items, but the technology is not limited to this configuration. For example, the work items of the work item memory section 146 may be configured to be stored in association with only the degrees of difficulty A to C of the work items.

The specific examples of the disclosure have been described above in detail. However, the specific examples are merely examples and do not limit the claims. The technology described in the claims includes various modifications and changes of the above-described exemplified specific examples. Technical elements described in the present description or the drawings exhibit technical usefulness alone or by various combinations and are not limited to combinations described in the claims at the time of application. The technology exemplified in the present description and the drawings simultaneously achieves multiple objects and has the technical usefulness by achieving one of the objects.

The invention claimed is:

1. A work management device that manages an electronic component mounting line with a plurality of mounting machines mounting electronic components on a board, the work management device comprising:

an operator information memory section that stores operator information regarding a plurality of operators working in the electronic component mounting line;

a work item memory section that stores a work item group performed by the plurality of operators in the electronic component mounting line;

a plurality of operator detection sections that are installed at a plurality of spots of the electronic component mounting line, the plurality of operator detection sections including a face detecting camera configured to image a face of an operator of the plurality of operators; and a work instruction section that instructs one operator among the plurality of operators to work a work item selected from the work item memory section, the work instruction section including a display, wherein an operator detection section of the plurality of operator detection sections detects the operator located near a spot at which the operator detection section is installed by comparing an image captured by the face detecting camera to the operator information, wherein in a case in which the operator detection section detects the operator, and the work item group stored in the work item memory section includes one work item or a plurality of work items to be performed by the operator detected by the operator detection section, the work instruction section instructs the operator detected by the operator detection section to perform at least one of the work items selected from the one work item or the plurality of work items, wherein the work item memory section or the operator information memory section stores each work item of the work item group in association with the operator information regarding the operator who is able to perform the work item, wherein the plurality of mounting machines are configured to detect end of the work items in the work item group and transmit the end of the work items and the operator information regarding the operator performing the work item to the work management device, and wherein the work management device further comprises an updating section that deletes the work item from the work item memory section and updates the work item group, in a case in which the end of the work item is received from the mounting machine, when the work item is worked based on the operator information by the operator who is able to perform the work item, and conversely does not delete the work item from the work item memory section when the work item is not worked by the operator who is able to perform the work item.

2. The work management device according to claim 1, wherein in the case in which the operator detection section detects the operator, and the work item group stored in the work item memory section does not include the work item to be performed by the operator detected by the operator detection section, the work instruction section instructs the operator detected by the operator detection section that there is no work item to be worked.

3. The work management device according to claim 1, wherein the plurality of mounting machines are configured to transmit a mounting actual result of the electronic components on the board to the work management device, and wherein the work management device further includes:
a work item addition section that adds a work item necessary in the mounting machine to the work item memory section based on the mounting actual results transmitted from the plurality of mounting machines.

4. The work management device according to claim 1, wherein each of the plurality of operator detection sections is associated with one mounting machine or the plurality of mounting machines near positions at which the operator detection section is installed.

5. The work management device according to claim 1, wherein the plurality of mounting machines are configured to detect end of the work items in the work item group and transmit the end of the work items to the work management device, and the display displays the one work item or all the plurality of work items for the operator detected by a specific operator detection section in a case in which the operator is detected by the specific operator detection section among the plurality of operator detection sections when the operator information regarding the operator detected by the specific operator detection section is identical to the operator information stored in the operator information memory section and the work item group stored in the work item memory section includes the one work item or the plurality of work items which are able to be performed by the operator detected by the specific operator detection section.

6. The work management device according to claim 1, wherein the work items of the work item groups are ranked in accordance with degrees of difficulty of the work items, wherein the operator information includes the degrees of difficulty of the work items which are able to be performed by the plurality of operators, wherein the work item memory section stores the work items in association with the degrees of difficulty, and wherein in a case in which the operator detection section detects the operator, and the work item group stored in the work item memory section includes the one work item or the plurality of work items associated with the degrees of difficulty equal to or lower than the degrees of difficulty ranked for the operator detected by the operator detection section, the work instruction section instructs the operator detected by the operator detection section in the one work item or the plurality of work items selected from the one work item or the plurality of work items.

7. A work management device that manages an electronic component mounting line with a plurality of mounting machines mounting electronic components on a board, the work management device comprising:

an operator information memory section that stores operator information regarding a plurality of operators working in the electronic component mounting line;

a work item memory section that stores a work item group performed by the plurality of operators in the electronic component mounting line;

a plurality of operator detection sections that are installed at a plurality of spots of the electronic component mounting line, the plurality of operator detection sections including a face detecting camera configured to image a face of an operator of the plurality of operators; and a work instruction section that instructs one operator among the plurality of operators to work a work item selected from the work item memory section, the work instruction section including a display, wherein an operator detection section of the plurality of operator detection sections detects the operator located near a spot at which the operator detection section is installed by comparing an image captured by the face detecting camera to the operator information, wherein in a case in which the operator detection section detects the operator, and the work item group stored in the work item memory section includes the one work item or a plurality of work items to be performed by the operator detected by the operator detection section, the work instruction section instructs the operator detected by the operator detection section to perform at least one of the work items selected from the one work item or the plurality of work items, wherein the work items of the work item groups are ranked in accordance with degrees of difficulty of the work items, wherein the operator information includes the degrees of difficulty of the work items which are able to be performed by the plurality of operators, wherein the work item memory section stores the work items in association with the degrees of difficulty, wherein in a case in which the operator detection section detects the operator, and the work item group stored in the work item memory section includes the one work item or the plurality of work items associated with the degrees of difficulty equal to or lower than the degrees of difficulty ranked for the operator detected by the operator detection section, the work instruction section instructs the operator detected by the operator detection section in the one work item or the plurality of work items selected from the one work item or the plurality of work items, wherein the plurality of mounting machines are configured to detect end of work items in the work item groups and transmit the end of the work item and the degrees of difficulty of the work items performed by the operator to the work management device, and wherein the work management device further comprises an updating section that deletes the work item from the work item memory section and updates the work item group, in a case in which the end of the work item is received from the mounting machine, when the work items are worked by the operator ranked with the degree of difficulty or more in which the work items are able to be performed, and conversely does not delete the work item from the work item memory section when the work item is worked by the operator ranked with the degree of difficulty lower than the degree of difficulty in which the work item is able to be performed.

8. The work management device according to claim 7, further comprising:

an environment map memory section that stores an environment map in which positional information regarding the plurality of mounting machines disposed in predetermined regions and the plurality of operator detection sections is recorded, wherein in a case in which support is requested, the work instruction section instructs the operator who is ranked with the degree of difficulty or more of the work item for which support is necessary and is closest to the mounting machine from which the support request is input to support the mounting machine to which the support request is input based on the environment map and a detection result of the operator detection section.

* * * * *